United States Patent Office 2,784,639
Patented Mar. 12, 1957

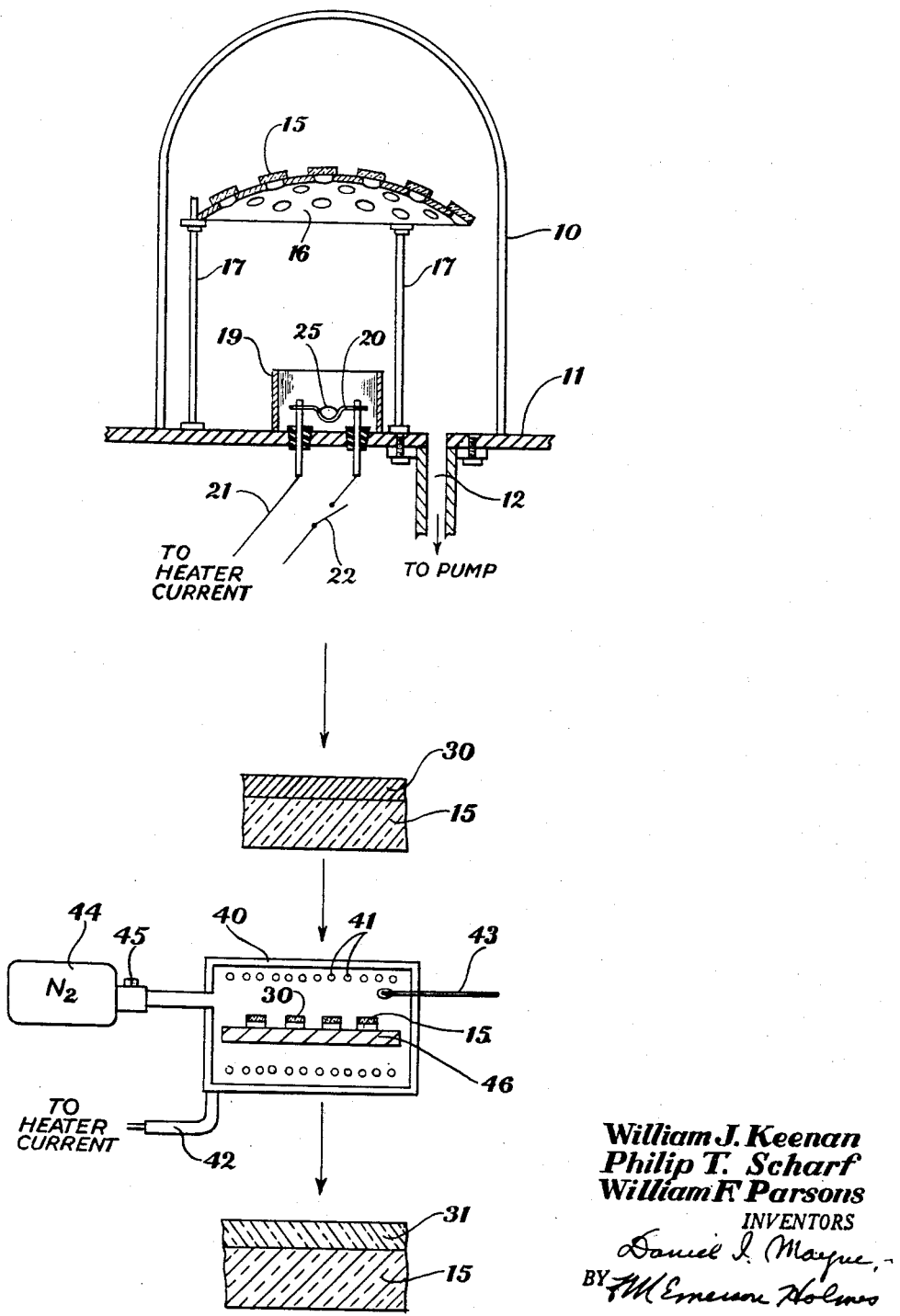

2,784,639

TITANIUM NITRIDE COATED OPTICAL ELEMENT

William J. Keenan, Philip T. Scharf, and William F. Parsons, Rochester, N. Y., assignors to Eastman Kodak Company, Rochester, N. Y., a corporation of New Jersey Application May 4, 1953, Serial No. 352,866

1 Claim. (Cl. 88—1)

This invention relates to optical interference coatings for optical elements, particularly to high index coatings.

For various optical purposes including high reflecting coatings and filters or other selective coatings it is well known to use transparent materials which have a high index of refraction either alone or with alternate layers of lower index materials. It is the object of the present invention to provide a particularly stable, durable, high index coating.

According to the invention the high index coating consists of titanium nitride.

Titanium is one of the few materials which will combine easily with nitrogen. We have found that titanium nitride coatings are at least as good as the best titanium dioxide coatings as far as transparency, index of refraction, and durability are concerned when coated as an interference layer less than a wavelength of light thick. Interference layers are commonly made in multiples of ⅛ wavelength thick, usually a ¼ wavelength layer. This, of course, covers a continuous range of thicknesses since the wavelengths of visible light and the useful parts of the infrared and ultraviolet cover a range of wavelengths. However, in practically all cases the thickness is less than a wavelength of light.

According to the present invention the preferred method of producing titanium nitride coatings on the surface of an optical element involves first evaporating a thin layer of metallic titanium onto the surface in a vacuum and then removing the coated element from the vacuum chamber, placing it in an oven and baking it in an atmosphere of substantially pure nitrogen at a temperature between 400° C. and the softening point of the optical element for a period of time between ½ and 10 hours. The optical element may consist of a piece of glass such as a lens or disc or it may include several optical interference layers. For example, a multiple layer coating may be made up of alternating layers of titanium nitride and magnesium fluoride and if the sixth or seventh layer consists of titanium nitride, the optical element receiving this layer according to the invention includes all the previous layers of magnesium fluoride and titanium nitride as well as the glass base.

The accompanying drawing is a flow chart illustrating the method of manufacture with the optical element shown greatly enlarged in the second and fourth steps.

In the drawing, a bell jar 10 carried by a base plate 11 is evacuated in the usual way through an outlet 12 leading to vacuum pumps. Within the bell jar optical elements 15 are carried on a perforated concave support 16 with a perforation under each element exposing the surface thereof to material evaporated from below. The concave perforated plate 16 is carried on supporting rods 17. A metallic boat 20 preferably consisting of a simple dimple in a tungsten ribbon is electrically heated through wires 21 and the current may be turned on or off by a switch 22 or by adjustment of a variable transformer, not shown. According to the invention, metallic titanium 25 is evaporated from the boat 20 at a pressure preferably less than $10^{-4}$ mm. Hg. This metallic titanium forms a layer 30 on the under surface of the optical element which is shown enlarged and turned over in the next step of the drawing. The elements 15 with the metallic coating 30 thereon are then placed on a support 46 in an oven 40 which is electrically heated by wires 41 connected by a suitable cable 42 to a source of heater current. The temperature in the oven is indicated by a suitable thermometer 43. This baking of the coated elements is carried on in a nitrogen atmosphere which is introduced from a container 44 through a valve 45. Preferably, nitrogen is permitted to leak continuously into the oven so that any of the atmosphere escaping through cracks in the oven will always be outward. Thus no air is allowed to leak in and contaminate the substantially pure nitrogen atmosphere within the oven. Also, of course, some nitrogen is combined with the titanium during the baking operation and must be continuously replenished. For reasonably rapid nitriding of the titanium, the temperature should be quite high but not sufficiently high to soften the optical element which is generally of glass. Accordingly, the temperature is maintained between 400° C. and the softening point of the element for a few hours, preferably between ½ and 10 hours. This is sufficient to nitride the layer completely and to render it quite transparent because the titanium layer itself is less than a wavelength of light thick.

We claim:

An optical element comprising a glass member and on a surface thereof an optical interference coating including a high index layer at least one-eighth wavelength of light and less than one wavelength of light thick, said layer consisting of titanium nitride, and being applied directly to the glass member.

References Cited in the file of this patent

UNITED STATES PATENTS

| | | |
|---|---|---|
| 1,985,118 | Van Geel et al. | Dec. 18, 1934 |
| 2,281,474 | Cartwright et al. | Apr. 28, 1942 |